United States Patent [19]

Spinelli et al.

[11] 4,374,619

[45] Feb. 22, 1983

[54] VARIABLE MAGNIFICATION COPYING APPARATUS

[75] Inventors: Richard A. Spinelli, Rochester; Edward C. Bock, Webster, both of N.Y.

[73] Assignee: Xerox Corporation, Stamford, Conn.

[21] Appl. No.: 317,033

[22] Filed: Nov. 2, 1981

[51] Int. Cl.³ .................... G03B 27/34; G03B 27/40; G03B 27/70

[52] U.S. Cl. .................................. 355/57; 355/8; 355/60

[58] Field of Search .................. 355/8, 11, 57, 65, 66, 355/55, 60

[56] References Cited

U.S. PATENT DOCUMENTS

| | | | |
|---|---|---|---|
| 3,476,478 | 11/1969 | Rees, Jr. | 355/55 |
| 3,542,467 | 11/1970 | Ferguson et al. | 355/8 |
| 3,614,222 | 10/1974 | Post et al. | 355/8 |
| 3,731,915 | 5/1973 | Guenther | 271/36 |
| 3,832,057 | 8/1974 | Shogren | 355/8 |
| 3,837,743 | 9/1974 | Amemiya | 355/60 |
| 3,884,574 | 5/1975 | Doi et al. | 355/66 |
| 4,013,361 | 3/1977 | Allis | 355/60 |
| 4,295,736 | 10/1981 | Ikeda | 355/57 |
| 4,335,953 | 6/1982 | Tsuchiya et al. | 355/57 |

*Primary Examiner*—Richard A. Wintercorn

[57] ABSTRACT

An optical system is provided for a copying apparatus which includes a plurality of components whose displacements relative to each other can be made to yield differing magnification at an imaging plane. In particular, during a magnification mode a dual rate scanning mirror pair is displaced a fixed distance and a catadioptric lens is displaced an identical distance, from their normal 1x positions. A third mirror, located at the photoreceptor plane is displaced a second distance. The displacements are a function of the magnification, the lens focal length and the angular displacement of the lens. All displacements are parallel to the document plane, resulting in a compact scanning system.

2 Claims, 2 Drawing Figures

VARIABLE MAGNIFICATION COPYING APPARATUS

BACKGROUND AND PRIOR ART

This invention relates to a reproducing apparatus of the electrostatographic type and, more particularly, to an optical system which provides, by displacement of various optical components, projection of a continuous range of reduction or enlargement images onto a flat imaging plane.

The prior art includes many examples of machines adapted to copy stationary original documents at a variety of magnification through the use of a scanning optical system. Examplary of patents in this area are U.S. Pat. Nos. 3,476,478 to Rees (add lens); 3,542,467 to Ferguson; 3,614,222 to Post; 3,837,743 to Amemiya; 3,884,574 to Doi et al. and 4,013,361 to Allis.

An important consideration in the type of optical system selected for a particular system is the space alloted within the machine for the optical system. For machines where compactness is a strict requirement, optical systems relying on add lens insertions and on lens and mirror motions towards and away from the photoreceptor are not particularly appropriate.

Efforts to reduce the volume taken up by optical components encounter problems such as the vignetting which occurs when closely spaced optical components interfere with and block light paths thereby reducing the quality of the resulting image. Additional problems which must be addressed by more compact systems are: elimination of the effects of field tilt at any of the various magnification values, and simplification of the motion of those optical components which must be displaced when varying the magnification.

SUMMARY

The present invention is therefore directed to an optical system for use in a variable magnification copying apparatus wherein enlarged or reduced images of an original document lying in an object plane are projected onto a flat imaging plane. The optical system includes a first mirror adapted to scan said document in a plane parallel to said object plane, a second mirror adapted to maintain a constant object conjugate during 1x operation but a variable object conjugate by displacement of a distance K during magnification, a lens located at a fixed location during 1.0x operation but displaced a distance K in a plane parallel to said object plane during magnification and a third mirror located in the optical path between said lens and said imaging plane, said mirror displaced a second distance N and adapted to reflect reduced or enlarged images onto the imaging plane while maintaining image conjugate.

This system thus produces a compact scan and projection system since all displacements are parallel to the object plane. The displacements are also such that object and image remain orthogonal at all times (i.e. there is no field tilt at any magnification). Equal displacement of the lens and second mirror enable a simple and cost effective displacement mechanism. Displacement of the third mirror maintains accurate focus throughout the magnification range.

DRAWINGS

DESCRIPTION

Figure 1:
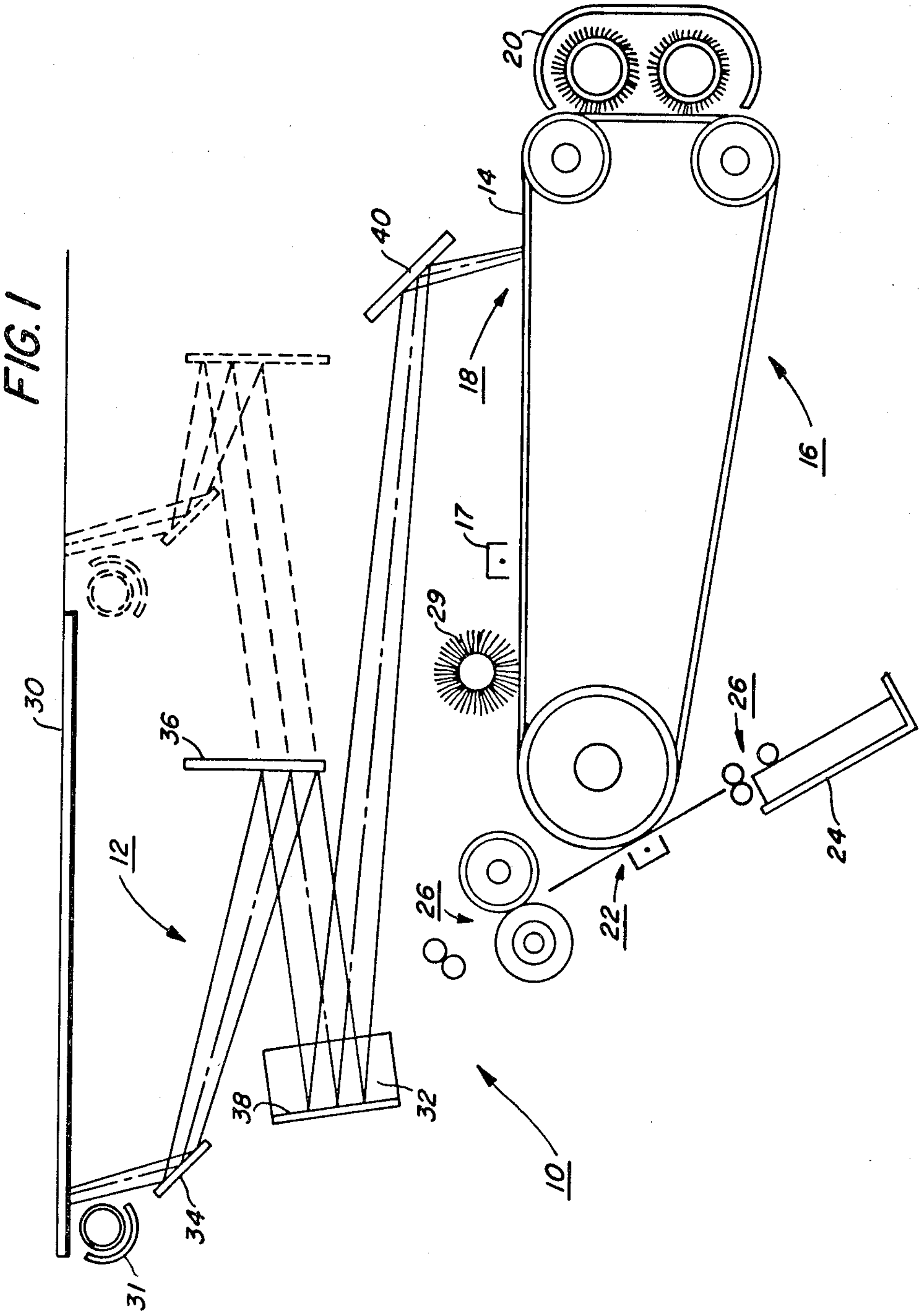
FIG. 1 is a schematic diagram of a variable magnification copier which utilizes the scanning optical system of the present invention at a 1x mode.

Referring now to FIG. 1, there is shown by way of example, a variable magnification copying apparatus 10 which incorporates an optical system 12 of the present invention.

The apparatus 10 depicted in FIG. 1 illustrates the various components utilized therein for xerographically producing copies from an original. Although the apparatus of the present invention is particularly well adapted for use in an automatic xerographic reproducing machine 10, it should become evident from the following description that it is equally well suited for use in a wide variety of electrostatographic systems and is not necessarily limited in its application to the particular embodiment shown herein.

Basically, the xerographic processor includes a rotatably mounted photoconductive belt 14 which is supported upon a pulley system 16 driven by motor means (not shown). The belt is driven in the direction indicated whereby its photoconductive surface is caused to pass sequentially through a series of xerographic processing stations whose operations are well known in the art and therefore are only briefly described below.

Initially, the photoconductive surface is uniformly charged by means of a corona generator 17. The charged surface is then advanced into an imaging station 18 wherein a flowing light image of an original document to be reproduced is projected onto the charged drum surface thus recording on the drum a latent electrostatic image containing the original input information. Next, subsequent to the exposure step in the direction of belt rotation, is a developing station 20 wherein the latent electrostatic image is rendered visible by applying an electroscopic marking powder (toner) to the photoreceptor surface in a manner well known and used in the art. The now visible image is then forwarded into a transfer station 22 wherein a sheet of final support material is brought into overlying moving contact with the toner image and the image transferred from the plate to the support sheet.

In operation, a supply of cut sheets are supported within the machine by means of a paper cassette 24. A pair of feed rollers 26 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the belt surface, as well as the other machine components through the main drive system whereby the support sheet is introduced into the transfer station in proper registration with the developed toner image on the belt. For further information concerning this type of sheet feeding mechanism, reference may be had to U.S. Pat. No. 3,731,915 to Guenther.

After transfer, but prior to the reintroduction of the imaged portion of the belt into the charging station, the belt surface is passed through a cleaning station 29 wherein the residual toner remaining on the plate surface is removed.

Upon completion of the image transfer operation, the toner bearing support sheet is stripped from the drum surface and into a thermal fusing station 26 wherein the toner image is permanently fixed to the sheet. The copy sheet with the fused image thereon is forwarded from the fuser into a collecting tray (not shown) where the sheet is held until such time as the operator has occasion to remove it from the machine.

Referring more particularly to optical system 12, as shown in FIG. 1, the system is shown operating in a 1x (unity) magnification mode. An original document to be reproduced is placed image side down upon a horizontal transparent viewing platen 30 and the document then scanned by means of the optical system 12. Optical system 12 consists of an illumination assembly 31, lens 32 and a pair of cooperating movable scanning mirrors 34 and 36. The lens is basically a half-lens objective having a reflecting surface 38 at the stop position to simulate a full lens system. The two mirrors are slidably supported between a pair of parallel horizontally aligned guide rails (not shown). For a further description and greater details concerning this type of optical scanning system reference is had to U.S. Pat. No. 3,832,057 to Shogren.

In practice, mirror 34, herein referred to as the full rate scan mirror, is caused to move from a home position, directly below the left hand margin of the platen to an end of scan position below the opposite margin of the platen. The rate of travel of the scan mirror is synchronized to the peripheral speed of moving photoreceptor belt 14. The second mirror 36 is simultaneously caused to move in the same direction as the scanning mirror at half the scanning rate. As the two mirrors sweep across the platen surface, an image of each incremental area thereon viewed by the scanning mirror is reflected towards the second mirror which, in turn, redirects the image back to the half lens system. The reflecting surface, positioned at the lens stop position, reverses the entering light rays and redirects the light rays back towards mirror 40 positioned directly above the belt surface at the exposure station 18. In this manner a flowing light image containing the original input scene information is focused upon the charged photoreceptor belt at a 1:1 magnification plate.

Figure 2:
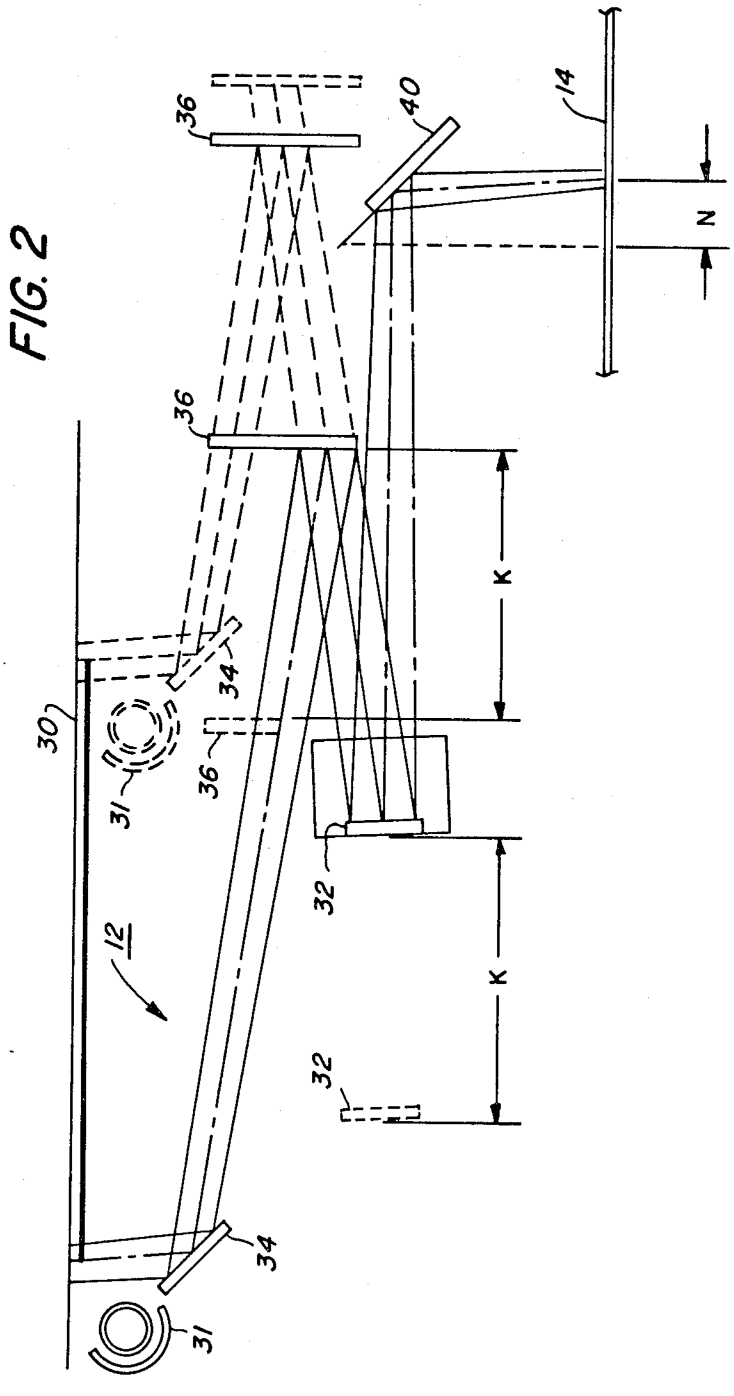
FIG. 2 is the scanning system of FIG. 1 operating in a reduction mode.

In accordance with the present invention, continuous reduction or enlargement modes are provided for by selective displacement of certain of the optical components. FIG. 2 shows the optical system with the components assuming a 0.647 displacement (reduction) position. (The xerographic process station and a portion of the belt have been omitted for purposes of clarity). As shown in FIG. 2, prior to start of scan, mirror 36 has been displaced away from mirror 34 a distance K and in a plane parallel to the platen. Lens 32 is also displaced a distance K relative to its 1.X position and also parallel to the platen. Lens 32 may be manually linked to mirror 36 or they may both be mounted on a single scan rail. Mirror 40 is displaced a distance N also parallel to the platen. Distances K and N are selected so as to maintain a constant overall image conjugate for the given magnification mode and are determined by the following equations:

$$K = \frac{-F(1+m)}{m(2\cos\alpha - 1)} \qquad (1)$$

-continued and $$N = \frac{K-(1+m)}{\cos\alpha} \qquad (2)$$

where: F is the focal length of lens 32 m is the magnification, and $\alpha$ is the angular displacement of the lens optical axis relative to the platen surface (the displacement resulting from the catadioptric nature of the lens).

For the system shown in FIG. 2 and assuming a 0.647X reduction mode, $\alpha$=4.0 degrees and a focal length F=12.5 inches, the distances K and N would be as follows:

$$K = \frac{12.5\,(1-.647)}{(-.647)\,(2\cos 4^\circ - 1)}$$

$$K = 6.853''$$

$$N = K - \frac{12.5\,(1-.647)}{(\cos 4^\circ)}$$

$$N = 6.853 - 4.423 = 2.429'$$

It is apparent that from the above equations, various values of K and D can be derived once a selected magnification and lens displacement are known. Since the distance N represents the movement of the exposure point along the process direction, the registration point for purpose of image transfer will require appropriate timing changes in the circuitry controlling the operation of paper feed roller 26. Appropriate timing and registration circuits are disclosed in U.S. Pat. Nos. 3,884,574; 4,013,365; 4,181,424 and 4,217,052. While the embodiment in FIG. 2 has shown a reduction mode, the system can also operate in enlargement modes.

We claim:

1. An optical system for use in a document reproducing apparatus wherein enlarged or reduced images of an original document lying in an object plane are exposed onto a flat imaging plane, said system including:

a first mirror adapted to scan said document in a plane parallel to said object plane, a second mirror adapted to maintain a constant object conjugate during 1x operation but a variable object conjugate by displacement of a distance K upon selection of a magnification mode, a lens located at a fixed location during 1x operation but displaced a distance K in a plane parallel to said object plane during a magnification mode, and a third mirror located in the optical path between said lens and said imaging plane, said mirror displaced a second distance N and adapted to reflect reduced or enlarged images onto the imaging plane while maintaining constant image conjugate.

2. The optical system of claim 1 wherein said lens is a catadioptric lens and the terms K and N are determined by the expression:

$$K = \frac{-F(1+m)}{m(2\cos\alpha - 1)}$$

and $$N = \frac{K - F(1+m)}{\cos\alpha}$$

where F is the focal length of the lens, m is the magnification and $\alpha$ is the angular displacement of the lens optical axis relative to the object plane.

* * * * *